United States Patent [19]

Kramer

[11] Patent Number: 4,766,685
[45] Date of Patent: Aug. 30, 1988

[54] LIGHT BOX

[75] Inventor: Heinz Kramer, Osnabrück, Fed. Rep. of Germany

[73] Assignee: Hinrichs Fotowerbung GmbH + Co. KG, Georgsmarienhütte, Fed. Rep. of Germany

[21] Appl. No.: 838,087

[22] Filed: Mar. 10, 1986

[30] Foreign Application Priority Data

Mar. 23, 1985 [DE] Fed. Rep. of Germany ....... 3510594

[51] Int. Cl.⁴ .............................................. G09F 13/04
[52] U.S. Cl. ......................................... 40/574; 40/564
[58] Field of Search ................. 40/575, 574, 573, 564, 40/361

[56] References Cited

U.S. PATENT DOCUMENTS

| | | | |
|---|---|---|---|
| 1,746,943 | 2/1930 | Hofmann | 40/574 |
| 2,163,329 | 6/1939 | Sipdor | 40/575 |
| 2,303,988 | 12/1942 | Christensen | 40/574 |
| 3,500,569 | 3/1970 | Simmons | 40/564 |

Primary Examiner—Robert Peshock
Assistant Examiner—J. Hakomaki
Attorney, Agent, or Firm—Jordan and Hamburg

[57] ABSTRACT

An illuminated sign. The illuminated sign comprises a cabinet with internal illumination, a diffusion plate, a transparent plate, and a retention strip with an associated camming strip.

The cabinet is provided with an internally facing, circumferential support flange, and a forwardly facing circumferential retention channel with longitudinal grooves therein.

In use, the diffusion and transparent plates (with indicia held therebetween) is releasably held on the support flange by the retention strip. Accidental removal of the retention strip is prevented by the interaction of the retention strip and the camming strip within the retention channel. This arrangement permits indicia to be quickly and easily changed from the front of the illuminated sign.

15 Claims, 2 Drawing Sheets

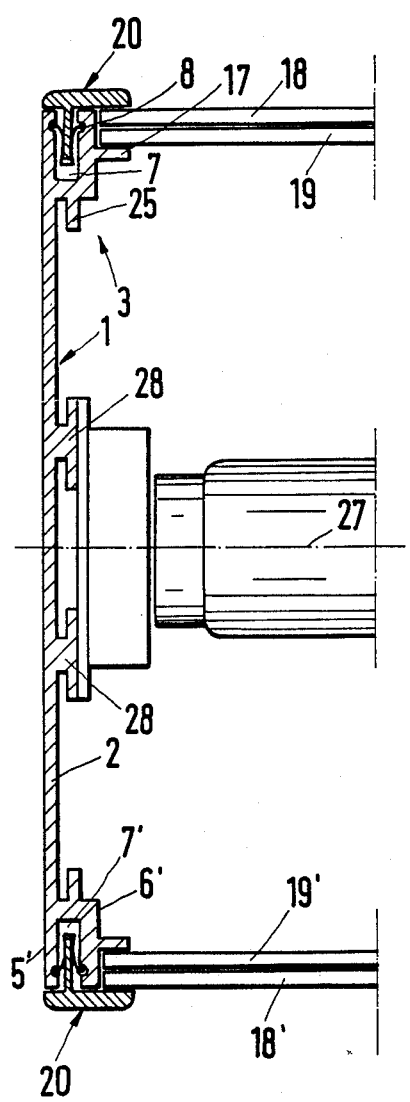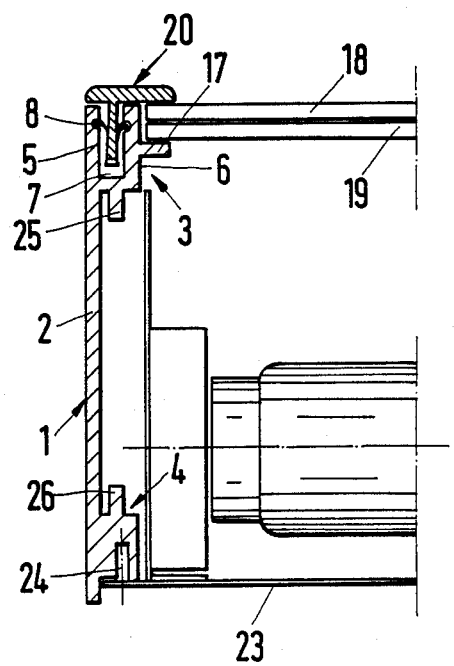

# 4,766,685

LIGHT BOX

BACKGROUND OF THE INVENTION

The invention refers to a light box for photographic transparencies or the like.

In a known, single or double-sided light box there is provided for each group of supporting plates a special supporting frame, which can be frontally inserted respectively in the outer frame and can be secured in position therein by snap-closures or by screws. The supporting frame consists of many parts and has to be opened and closed again for a change of the photographic transparency. Such a configuration is relatively complicated, expensive to produce, inconvenient to handle when the photographic transparency is changed, and can only be utilized for light boxes of angular shapes.

SUMMARY OF THE INVENTION

The object of the invention is to provide a light box of the aforementioned kind which can be produced especially simply and economically and which, while providing a safe support of the supporting plates of the transparencies, permits a quick and simple frontal change of the photographic transparency.

The object of the invention is solved by a light box of the kind mentioned in the preamble of claim 1, firstly, by the features mentioned in the characteristic part of claim 1.

The light box according to the invention can be extremely simply and economically made of aluminium as well as plastic. The supporting plates receiving between each other a photographic transparency can respectively be directly inserted frontally in the outer frame and are simply and safely secured by the attachable sealing profile strips. For the purpose of changing the photographic transparency, the sealing profile strips can quickly be detached without tools. Simultaneously, they form a respective frontal decorative element, because the covering part, regardless of its function in the edge support of the supporting plates, can be configured in many ways in order to achieve a visual effect.

Preferably in the retaining pocket, there is an approximately U-shaped, resiliently deformable clamping profile part, which can be made of PVC, polyethylene or any other suitable, elastic material, for example also rubber. This clamping profile part forms a compensating element in case of deviations of tolerance and changes of shape of the light box due to mechanical or thermal influences and at the same time increases the grip with which the plug-in portion of the sealing profile strip is secured in the retaining pocket.

Further details and advantages of the invention result from the following description and the drawing, in which two exemplary embodiments of the object of the invention will be illustrated in greater detail.

BRIEF DESCRIPTION OF THE DRAWINGS

FIG. 1 is a broken-away sectional view through a single-sided light box according to the invention;

FIG. 2 is an illustration similar to FIG. 1 of a light box according to the invention, of a double-sided configuration.

DESCRIPTION OF THE PREFERRED EMBODIMENTS

Figure 3:
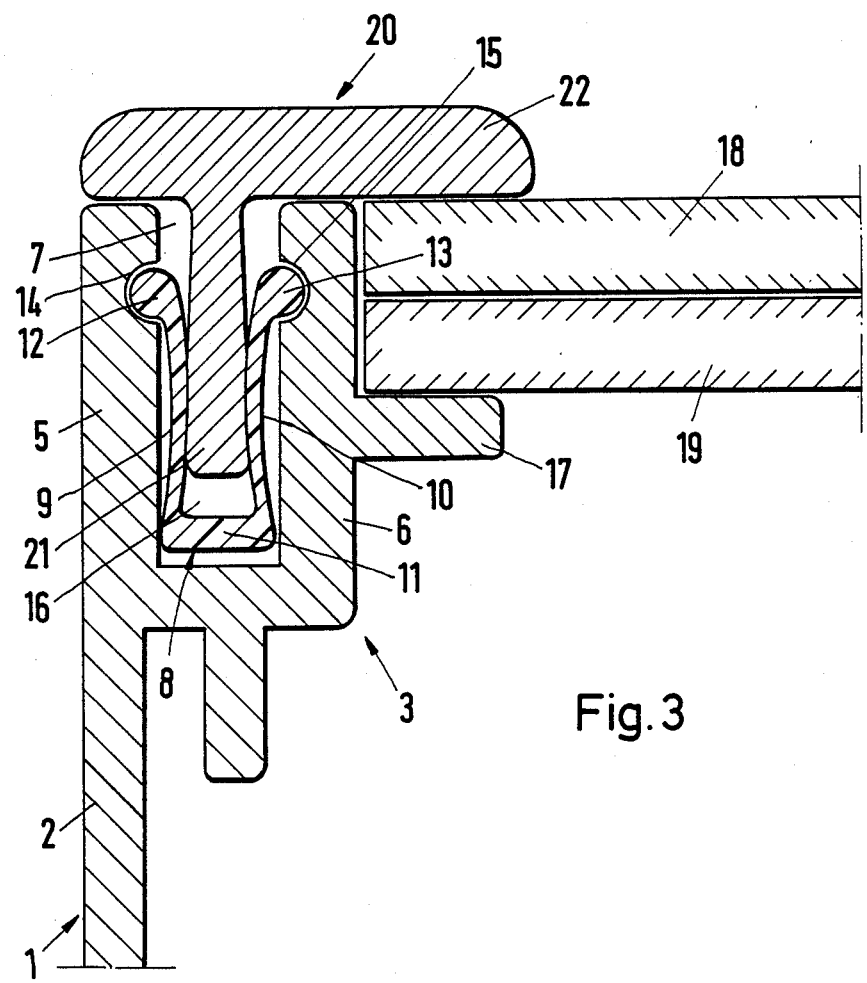
FIG. 3 is a broken-away enlargement of a sectional view of an edge area of the cross-sectional profile of the outer frame.

The single-sided light box illustrated in FIG. 1 essentially comprises an outer frame 1, which usually consists of a number of frame supports which are joined together. The cross-sectional profile of the outer frame 1, or the frame supports thereof, comprises a thin wall part 2 and longitudinal molded projections 3, 4 extending along the inside thereof. As can be seen in FIG. 1, and in particular in FIG. 3, the frontal longitudinal edge area 5 of the wall part 2 and an angle flange 6 extending longitudinally on the inside thereof define a frontally open retaining pocket 7, in which there is disposed a clamping profile part 8 made of an elastic material, such as for example, PVC or polyethylene. This clamping profile part 8 can extend as a strip along the entire length of the retaining pocket 7. However, the clamping profile part 8 can also be configured in sections of various lengths, which can be distributed and arranged at a respective distance over the length of the retaining pocket 7.

The clamping profile part has an approximately U-shaped cross-section and has inwardly bent side legs 9, 10 and a floor leg 11. On the outside of the side legs 9, 10 and along the free edges thereof, the clamping profile part 8 is provided with longitudinally extending retention projections 12, 13 having approximately a semi-circular cross-section, the retention projections 12, 13 engaging in their turn in the opposite walls of the retention pockets 7 in longitudinal grooves 14, 15 of approximately semi-circular cross-sections. Thus the clamping profile part 8 is thereby arrested in the retaining pocket 7 without thereby impairing the deformability of the side legs 9, 10. The side legs 9, 10 along with the floor leg 11 define a pocket 16, of which the inside diameter, due to the arched curvature of the side legs 9, 10, which begins at the entrance opening at the level of the retention projections 12, 13 at first becomes narrowed and then widened again towards the floor leg 11.

The leg of the angle flange 6 extending parallel to the wall part 2 or to the longitudinal wall area 5 thereof is provided with an inwardly protruding, longitudinal abutment flange 17 which forms the inner abutment for two supporting plates 18, 19, between which is arranged a photographic transparency which is not illustrated. Thus the supporting plate 19 usually consists of a ground-glass diffusion plate and the supporting plate 18 of a clear-glass plate.

The supporting plates 18, 19 are being held in their mounting position by a sealing profile strip 20 extending along the entire length of the retaining pocket 7, i.e., along the entire circumferential length of the outer frame 1. The sealing profile strip 20 is provided with a plug-in part 21 which engages in the pocket 16 in the clamping profile part 8, as can be seen especially clearly in FIG. 3. During the insertion of the clamping profile part 8 into the pocket 16, the plug-in part 21 expands the inwardly arched side legs 9, 10 which make contact with the plug-in part 21 due to the deformation from the pressure. The plug-in part 21 can have a thickness which increases from the covering part 22 towards its free end, as illustrated, which reinforces the fastening of the covering profile strip 20. The maximum thickness of the plug-in part 21 at its free end is somewhat less than the maximum width of the inner cross-section of the pocket 16 in the clamping profile part 8, as provided at the height of the floor leg 11. In connection with the dimension of the parts, to which it is expressly referred to in FIG. 3, it safeguards that upon the insertion of the plug-in part 21 of the sealing profile strip 20, the clamping profile part 8 can be freely deformed and leaves sufficient compensating play. It is preferable in this connection, that the clamping profile part 8 is engaged only in the area of the retention projections 12, 13 with the walls of the retaining pocket 7, i.e., that it is to some extent freely suspended.

The covering part 22 of the sealing profile strip 20 overlaps the retaining pocket 7, ends on the outside at the outer surface of the wall part 2 of the outer frame 1 and projects inwardly beyond the angle flange 6 so that together with the abutment flange 17 it forms a groove-shaped pocket for the edge support of the supporting plates 18, 19.

In the configuration according to FIG. 1 the backside of the light box is closed by a back wall 23 which can be fastened by screws which can be screwed into a longitudinal groove 24 in the molded projection 4. On the inside of the light box there are provided one or more fluorescent strip lamps which can be supported together with the respective control components on the back wall 23. However, for the support, there can also be used flanges 25, 26 extending parallel to the wall part 2 and which are tip-stretched on the angle flange 6 or molded projection 4.

In the double-sided configuration of the light box illustrated in FIG. 2, the rear longitudinal edge area 5' of the wall part 2 along with a respective angle flange 6' defines a holding pocket 7' which is open in the rear and which forms with a respective sealing profile strip 20 an edge support of the same kind for rear supporting plates 18', 19'. Preferably, the cross-sectional profile of the outer frame 1 is symmetrical to an imagined median plane parallel to the longitudinal edges of the wall part 2.

For the support of the fluorescent strip lamps, the wall part 2 is provided on the inside with additional longitudinal flanges 28.

I claim:

1. A light box for photographic transparencies or the like comprising an outer frame means supporting transparent supporting plates, said frame means comprising a wall having a longitudinal edge portion, a projection means extending from said wall, said edge portion and said projection means defining a retention pocket, plug-in means resiliently retainable in said retention pocket, said plug-in means comprising an approximately U-shaped and resiliently deformable clamping part and a plug-in part having an insertion portion disposed within said clamping part, said clamping part having two leg portions and a bottom portion, each of said two leg portions having a free end with a projection thereon, said edge portion of said wall and said projection means having grooves receiving said projections to retain said plug-in part in said retention pocket, said plug-in part having a cover part overlying said projection means, said projection means having a lateral extension which together with said cover part forms a groove for receiving and supporting said transparent supporting plates.

2. A light box according to claim 1, wherein said wall has a second longitudinal edge portion spaced from the first said edge portion, a second projection means extending from said wall, said second edge portion and said second projection means defining a second retention pocket, second plug-in means retainable in said second retention pocket, said second plug-in means having a second cover part overlying said second projection means, said second projection means having a second lateral extension which together with said second cover part form a second groove for receiving and supporting second transparent support plates.

3. A light box according to claim 2, wherein the first said edge portion and the first said projection means are symmetrical with respect to a median plane with said second edge portion and said second projection means respectively.

4. A light box according to claim 1, wherein said cover part extends generally perpendicularly from said insertion portion.

5. A light box according to claim 1, wherein said cover part extends perpendicular from opposite sides of said insertion portion.

6. A light box according to claim 1, wherein said cover part is parallel to said lateral extension.

7. A light box according to claim 1, wherein each of said projections and each of said grooves extend longitudinally with an approximately semi-circular cross-sectional configuration.

8. A light box according to claim 1, wherein each of said leg portions has an arcuate configuration such that the space between said two leg portions initially progressively narrows and then progressively widens again as said bottom portion is approached.

9. A light box according to claim 1, wherein said insertion portion has a free end, said insertion portion having a thickness which increases as said free end is approached.

10. A light box according to claim 1, wherein the maximum thickness of said insertion portion is less than the maximum distance between said two leg portions at said bottom portion.

11. A light box according to claim 1, wherein said clamping part engages said edge portion of said wall and said projection means only in the area of said grooves and projections.

12. A light box according to claim 1, wherein said projection means has a bottom wall which defines the bottom of said retention pocket, said U-shaped clamping part being spaced from said bottom wall.

13. A light box according to claim 1, wherein said projection means has a bottom part extending perpendicularly from said edge portion of said wall and a side portion extending perpendicularly from said bottom part, said side portion being parallel to said edge portion of said wall, said lateral extension extending perpendicularly from said side portion.

14. A light box for photographic transparencies or the like comprising an outer frame means supporting transparent supporting plates, said frame means comprising a wall having a longitudinal edge portion, a projection means extending from said wall, said edge portion and said projection means defining a retention pocket, plug-in means disposed in said retention pocket, said plug-in means comprising two parts, one of said parts being a resiliently deformable U-shaped clamping part disposed in said retention pocket, the other of said parts having an insertion portion and a cover portion, said insertion portion being resiliently retained within said retention pocket by said resiliently deformable U-shaped clamping part, said cover portion overlying said projection means, said projection means having a lateral extension which together with said cover portion from a groove for receiving and supporting said transparent supporting plates.

15. A light box for photographic transparencies or the like comprising an outer frame means supporting transparent supporting plates, said frame means comprising a wall having a longitudinal edge portion, a projection means extending from said wall, said edge portion and said projection means defining a retention pocket, plug-in means retainable in said retention pocket, said plug-in means comprising a resiliently deformable clamping part having spaced leg portions and a plug-in part having an insertion portion disposed between said spaced leg portions, said plug-in part having a cover portion overlying said projection means, said projection means having a lateral extension which together with said cover part forms a groove for receiving and supporting said transparent supporting plates, and retention means in said retention pocket cooperating with said resilient clamping part for retaining said resilient clamping part in said retention pocket.

* * * * *